(12) United States Patent
Ostrometzky et al.

(10) Patent No.: US 11,681,075 B2
(45) Date of Patent: Jun. 20, 2023

(54) RELATING RAIN INTENSITY AND DYNAMIC RANGE IN COMMERCIAL MICROWAVE LINKS

(71) Applicant: RAMOT AT TEL-AVIV UNIVERSITY LTD., Tel Aviv (IL)

(72) Inventors: Jonathan Ostrometzky, Tel Aviv (IL); Hagit Messer-Yaron, Tel Aviv (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 0 days.

(21) Appl. No.: 17/526,783

(22) Filed: Nov. 15, 2021

(65) Prior Publication Data

US 2022/0075094 A1 Mar. 10, 2022

Related U.S. Application Data

(63) Continuation of application No. 16/101,463, filed on Aug. 12, 2018, now Pat. No. 11,204,443.
(Continued)

(51) Int. Cl.
*G01W 1/10* (2006.01)
*G01W 1/14* (2006.01)
(Continued)

(52) U.S. Cl.
CPC ............ *G01W 1/10* (2013.01); *G01S 13/003* (2013.01); *G01S 13/951* (2013.01); *G01W 1/14* (2013.01)

(58) Field of Classification Search
CPC .... G01S 13/003; G01S 13/931; G01S 13/951; G01W 1/10; G01W 1/14; G01W 1/00; B60W 40/02; Y02A 90/10
(Continued)

(56) References Cited

U.S. PATENT DOCUMENTS 3,875,400 A * 4/1975 Pao .................. H04B 10/1121
398/163
6,016,313 A * 1/2000 Foster, Jr .......... H04W 72/0486
455/562.1
(Continued)

OTHER PUBLICATIONS

Harel, O. et al., "The Potential of Microwave Communication Networks to Detect Dew—Experimental Study," IEEE Journal of Selected Topics in Applied Earth Observations and Remote Sensing, vol. 8, No. 2, Sep. 2015, pp. 4396-4404. (Year: 2015).*
(Continued)

*Primary Examiner* — Jeffrey P Aiello
(74) *Attorney, Agent, or Firm* — Browdy and Neimark, P.L.L.C.

(57) ABSTRACT

Computerized method and system for estimating a rain attribute on microwave communications, the estimation being carried out by: obtaining quantized minimum and maximum levels of received signals and transmitted signals over a microwave link during a period; subtracting the quantized maximum level of received signals from the quantized minimum level of transmitted signals to provide a minimal attenuation value; subtracting the quantized minimal level of received signals from the quantized maximal level of transmitted signals to provide a maximal attenuation value; calculating an attenuation difference related to the period by subtracting the minimal attenuation value from the maximal attenuation value; calculating a bias compensated attenuation difference based on the attenuation difference, and bias value related to the microwave link; and calculating the rain attribute, including the average rain during the period, based on the bias compensated attenuation difference.

15 Claims, 6 Drawing Sheets

Related U.S. Application Data

(60) Provisional application No. 62/544,953, filed on Aug. 14, 2017.

(51) Int. Cl.
  G01S 13/00 (2006.01)
  G01S 13/95 (2006.01)

(58) Field of Classification Search
  USPC .......... 73/170.16; 340/905; 375/219; 702/3, 702/66, 188–189
  See application file for complete search history.

(56) References Cited

U.S. PATENT DOCUMENTS

| | | | | |
|---|---|---|---|---|
| 7,499,708 | B2* | 3/2009 | Singh | H04W 76/40 455/39 |
| 2006/0052067 | A1* | 3/2006 | Singh | H04W 76/40 455/108 |
| 2014/0355447 | A1* | 12/2014 | Gohite | H04L 45/125 370/236 |
| 2016/0324478 | A1* | 11/2016 | Goldstein | A61B 5/6803 |
| 2017/0371074 | A1* | 12/2017 | Elkabetz | G01W 1/10 |

OTHER PUBLICATIONS

Cherkassky, D. et al., "Precipitation Classification Using Measurements from Commercial Microwave Links," IEEE Transactions on Geoscience and Remote Sensing, vol. 52, No. 5, May 2014, pp. 2350-2356. (Year: 2015).*

Aydin, K. et al., "Relationships Between Rainfall Rate and 35-GHz Attenuation and Differential Attenuation: Modeling the Effects of Raindrop Size Distribution, Canting, and Oscillation," IEEE Transactions on Geoscience and Remote Sensing, vol. 40, No. 11, Nov. 2002, pp. 2343-2352. (Year: 2002).*

Ostrometzky, et al.. Induced Bias in Attenuation Measurements Taken From Commercial Microwave Links, 2017 IEEE International Conference on Acoustics, Speech and Signal Processing (ICASSP). IEEE, 2017, pp. 3744-3748.

Aydin, et al., Relationships Between Rainfall Rate and 35-GHz Attenuation and Differential Attenuation: Modeling the Effects of Raindrop Size Distribution, Canting, and Oscillation, IEEE Transactions on Geoscience and Remote Sensing, vol. 40, No. 11, Nov. 2002, pp. 2343-2352.

D. Cherkassky, J. Ostrometzky, and H. Messer, Precipitation classification using measurements from commercial microwave links, IEEE Transactions on Geoscience and Remote Sensing, 52/5, 2014.

C Chwala, F Keis, and H Kuntsmann, Real time data acquisition of commercial microwave link networks for hydrometeorological applications. Atmosphe Measurement Techniques Discussions, 8(11), 2015.

Noam David and H Oliver Gao, Using cellular communication networks to detect air pollution, Environmental Science & Technology, 50(17):9442-9451, 2016.

Noam David, Omry Sendik, Hagit Messer, and Pinhas Alpert. Cellular network infrastructure-the future of fog monitoring? Bulletin of the American Meteorological Society, 2014.

Ericsson, Microwave towards 2020, delivering high-capacity and costefficient backhaul for broadband networks today and in the future. http://www.ericsson.com/res/docs/2014/microwave-towards-2020.pdf.

Oren Goldshtein, Hagit Messer, and Artem Zinevich, Rain rate estimation using measurements from commercial telecommunications links. IEEE Transactions on signal processing, 57(4):1616-1625, 2009.

O. Goldstein, H. Messer, and A. Zinevich. Rain rate estimation using measurements from commercial telecommunications links. IEEE Transactions on Signal Processing, 57:1616-1625, 2009.

Robert M. Gray and David L. Neuhoff. Quantization. IEEE transactions on information theroy, 44(6):2325-2383, 1998.

J. Hansryd and P.E. Eriksson, High-speed mobile backhaul demonstrators. Ericsson Review, 2:10-16, 2009. http://www.ericsson.com/ericsson/ corpinfo/publications/review/200902/files/Backhaul.pdf.

O. Harel, N. David, P. Alpert, and H. Messer. The potential of microwave communication networks to detect dew—experimental study. Journal IEEE, 8(9):4396-4404, 2015.

ITU-R. Specific attenuation model for rain for use in prediction methods. ITU-R, 838-3, 1992-1999-2003-2005.

ITU-R. Propagation data and prediction methods required for the design of terrestrial line-of-sight systems. 530-15, 2009.

I Kollar. Bias of mean value and mean square value measurements based on quantized data. *IEEE transactions on instrumentation and measurement*, 43(5):733-739, 1994.

H. Leijnse, R. Uijlenhoet, and J. Stricker. Rainfall measurement using radiation links from cellular communication networks. *Water Resources*, 43, 2007.

Y. Liberman and H. Messer. Accurate reconstrcution of rain fields maps from commercial microwave networks using sparse field modeling. *ICASSP 2014*, 2014.

H. Messer and O. Sendik. A new approach to precipitation monitoring. *IEEE Signal Processing Magazine*, pp. 110-122, May 2015.

H. Messer, A. Zinevich, and P. Alpert. Environmental monitoring by wireless communication networks. *Science*, 312:713, 2006.

J. Ostrometzky, D. Cherkassky, and H. Messer. Accumulated precipitation estimation using measurements from multiple microwave links. *Adv. Meteorology*, Special Issue (PRES), 2015.

J. Ostrometzky and H. Messer. Accumulated rainfall estimation using maximum attenuation of microwave radio signal. *IEEE, SAM*, pp. 193-196, 2014.

J. Ostrometzky, R. Raich, A. Eshel, and H. Messer. Calibration of the attenuation-rain rate power-law parameters using measurements from commercial microwave networks. *The 41st IEEE Int. Conf. on Acoutings, Speach and Signal Processing (ICASSP)*, Mar. 20-25, Shanghai, China, 2016.

A. Overeem, H. Leijnse, R. Uijlenhoet. Measuring urban rainfall using microwave links from commercial cellular communication networks. *Water Resources Research*, 47:W12505, 2011.

A. Overeem, H. Leijnse, and R. Uijlenhoet. Country-wide rainfall maps from cellular communication networks. *Proceedings of the National Academy of Sciences*, 110.8:2741-2745, 2013.

Ericsson website. http://www.ericsson.com.

\* cited by examiner

Obtaining (a) a quantized minimum level of received signals over a microwave link during a period, (b) a quantized maximum level of received signals over the microwave link during the period, (c) a quantized minimum level of transmitted signals over the microwave link during the period, and (d) a quantized maximum level of transmitted signals over the microwave link during the period. 310

Subtracting (i) the quantized maximum level of received signals over the microwave link during the period from (ii) the quantized minimum level of transmitted signals over the microwave link during the period to provide a minimal attenuation value. 320

Subtracting (i) the quantized minimal level of received signals over the microwave link during the period from (ii) the quantized maximal level of transmitted signals over the microwave link during the period to provide a maximal attenuation value. 330

Calculating an attenuation difference related to the period by subtracting the minimal attenuation value from the maximal attenuation value. 340

Calculating the bias value. 345

Calculating a bias compensated attenuation difference based on the attenuation difference, and bias value related to the microwave link. 350

Calculating the rain attribute based on the bias compensated attenuation difference. 360

Performing microwave link management operations based on the bias value. 370

Obtaining (a) a quantized minimum level of received signals over a microwave link during a test period that is rainless and during which a signal of constant power is transmitted over the microwave link, (b) a quantized maximum level of received signals over the microwave link during the test period, (c) a quantized minimum level of transmitted signals over the microwave link during the test period, and (d) a quantized maximum level of transmitted signals over the microwave link during the test period. 410

Subtracting (i) the quantized maximum level of received signals over the microwave link during the test period from (ii) the quantized minimum level of transmitted signals over the microwave link during the test period to provide a minimal attenuation value. 420

Subtracting (i) the quantized minimal level of received signals over the microwave link during the test period from (ii) the quantized maximal level of transmitted signals over the microwave link during the test period to provide a maximal attenuation value. 430

Calculating bias value by subtracting the minimal attenuation value from the maximal attenuation value. 440

Performing microwave link management operations based on the bias value. 470

RELATING RAIN INTENSITY AND DYNAMIC RANGE IN COMMERCIAL MICROWAVE LINKS

CROSS REFERENCE

This application claims priority from U.S. provisional patent 62/544,953 filing date Aug. 14, 2017.

BACKGROUND

Wireless communication networks commonly use wireless microwave links, known to be sensitive to weather conditions and are the backhaul of wireless communication networks.

Network Management Systems (NMS) provide records of measurements of the transmitted and the received signals levels from the different Commercial Microwave Links (CMLs) for monitoring and analyzing the network performance. Many of them log only the extreme values, i.e., the minimum and the maximum levels of the transmitted and the received signals in pre-set intervals (usually fifteen minutes long intervals)—where only quantized version of these measurements are logged in order to save bandwidth and storage space.

These rough measurements are then used to monitor the link budget with regard to the acceptable fading margin of the signal, and recently to estimate rain. However, these measurements pass lossy transformations, which induce errors into the monitoring and the estimation procedures.

SUMMARY

There may be provided a computer program product that stores instructions that once executed by a computerized system cause the computerized system to estimate a rain attribute, by: obtaining (a) a quantized minimum level of transmitted signals over the microwave link during the period, and (d) a quantized maximum level of transmitted signals over the microwave link during the period; subtracting (i) the quantized maximum level of received signals over the microwave link during the period from (ii) the quantized minimum level of transmitted signals over the microwave link during the period to provide a minimal attenuation value, subtracting (i) the quantized minimal level of received signals over the microwave link during the period from (ii) the quantized maximal level of transmitted signals over the microwave link during the period to provide a maximal attenuation value; calculating an The attenuation difference, and bias value related to the microwave link; and calculating the rain attribute based on the bias compensated attenuation difference.

There may be provided computerized method for estimating a rain attribute, the method may include: obtaining (a) a quantized minimum level of received signals over a microwave link during a period, (b) a quantized minimum level of transmitted signals over the microwave link during the period, and (d) a quantized maximum level of transmitted signals over the microwave link during the period; subtracting (i) the quantized minimum received signals over the microwave link during the period from (ii) the quantized minimum level of transmitted signals over the microwave link during the period to provide a minimal attenuation value, subtracting (i) the quantized minimal level of received signals over the microwave link during the period from (ii) the quantized maximal level of transmitted signals over the microwave link during the period to provide a maximal attenuation value; calculating an attenuation difference related to the period by subtracting the minimal attenuation value from the maximal attenuation value; calculating a bias compensated attenuation difference based on the attenuation difference, and bias value related to the microwave link; and calculating the rain attribute based on the bias compensated attenuation difference.

The computerized method wherein the average rain during the period equals $$\left(\frac{A_r^{max}}{a_{cal}^{max} \cdot L}\right)^{\frac{1}{b}},$$

wherein $A_r^{max}$ is the bias compensated attenuation difference, L is a length of the microwave link, $\alpha_{cal}^{max}$ is approximated by $\alpha(\ln(K)+\gamma)^b$, a and b are Power Law coefficients The computerized method may in elude calculating the bias value related to the microwave link by subtracting (i) a minimal attenuation value related to a test period from (ii) a maximal attenuation value related to the test period, wherein the test period is free of rain and during which a signal of constant power is transmitted over the microwave link.

The period may exceed five minutes.

The computerized method may include performing microwave link management operations based on the bias value The computerized method may include controlling a power of signals transmitted over the microwave link (dynamic range control) based on the bias value.

The computerized method may include measuring a minimum level of received signals over a microwave link during the period, the maximum level of received signals over the microwave link during the period, a minimum level of transmitted signals over the microwave link during the period, and a maximum level of transmitted signals over the microwave link during the period.

There may be provided a computer program product that atoms instructions that once executed by a computerized system cause the computerized system to estimate a rain attribute, by: obtaining (a) a quantized minimum level of received signals over a microwave link during a first period, (b) a quantized maximum level of received signals over the microwave link during a period that is included in the first period, (c) a quantized minimum level of transmitted signals over the microwave link during the first period, and (d) a quantized maximum level of transmitted signals over the microwave link during the period; subtracting (i) the quantized maximum level of received signals over the microwave link during ten period from (ii) the quantized minimum level of transmitted signals over the microwave link during the first period to provide a minimal attenuation value subtracting (i) the quantized minimal level of received signals over the microwave link during the first period from (ii) the quantized maximal level of transmitted signals over the microwave link during the period to provide a maximal attenuation value; calculating an attenuation difference by subtracting (i) the minimal attenuation value from (ii) the maximal attenuation value calculating a bias compensated attenuation difference based on (i) the attenuation difference, and (ii) bias value related to the microwave link; and calculating the rain attribute based on the bias compensated attenuation difference.

There may be provided a computerized method for estimating a rain attribute, the method may include: obtaining (a) a quantized minimum level of received signals over a microwave link during a first period, (b) a quantized maximum level of received signals over the microwave link during a period that is included in the first period, (c) a quantized minimum level of transmitted signals over the microwave link during the first period, and (d) a quantized maximum level of transmitted signals over the microwave link during the period; subtracting (i) the quantized maximum level of received signals over the microwave link during the period from (ii) the quantized minimum level of transmitted signals over the microwave link during the first period to provide a minimal attenuation value; subtracting (i) the quantized minimal level of received signals over the microwave link during the first period from (ii) the quantized maximal level of transmitted signals over the microwave link during the period to provide a maximal attenuation value; calculating an attenuation difference by subtracting (i) the minimal attenuation value from (ii) the maximal attenuation value, calculating a bias compensated attenuation difference based on (i) the attenuation difference, and (ii) bias value related to the microwave link; and calculating the rain attribute based on the bias compensated attenuation difference.

There may be provided a computer program product that stows instructions that once executed by a computerized system cause the computerized system to estimate bias, by: obtaining (a) a quantized minimum level of received signals over the microwave link test period that is rainless and during which a signal of constant power is transmitted over the microwave link, (b) a quantized maximum level of received signals over the microwave link during the test period, (c) a quantized minimum level of transmitted signals over the microwave link during. the test period, and (d) a quantized maximum level of transmitted signals over the microwave link during the test period, subtracting (i) the quantized maximum level of received signals over the microwave link during the rest period from (U) the quantized minimum level of transmitted signals over the microwave link during the teat period to provide a minimal attenuation value, subtracting (i) the quantized minimal level of received signals over the microwave link during the test period from (ii) the quantized maximal level of transmitted signals over the microwave link during the text period to provide a maximal attenuation value; and calculating bias value by subtracting the minimal attenuation value from the maximal attenuation value.

There may be provided a computerized method for bias detection, the method may include: obtaining (a) a quantized minimum level of received signals over a microwave link during a test period that is rainless and during which a signal of constant power is transmitted over the microwave link, (b) a quantized maximum level of received signals over the microwave link during the test period, (c) a quantized minimum level of transmitted signals over the microwave link during the test period, and (d) a quantized maximum level of transmitted signals over the microwave link during the test period, subtracting (i) the quantized maximum level of received signals over the microwave link during the test period from (ii) the quantized minimum level of transmitted signals over the microwave link during the test period to provide a minimal attenuation value; subtracting (i) the quantized minimal level of received signals over the microwave link during the test period from (ii) the quantized maximal level of transmitted signals over the microwave link during the test period to provide a maximal attenuation value; and calculating bias value by subtracting the minimal attenuation value from the maximal attenuation value.

The computerized method may include controlling a power of signals transmitted over the microwave link based on the bias value.

The computerized method may include measuring a minimum level of received signals over a microwave link during the test period, the maximum level of received signals over the microwave link during the test period, a minimum level of transmitted signals over the microwave link during the test period, and a maximum level of transmitted signals over the microwave link during the test period.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 illustrates a method; and FIG. 6 illustrates a method.

DETAILED DESCRIPTION OF THE DRAWINGS

Figure 1:
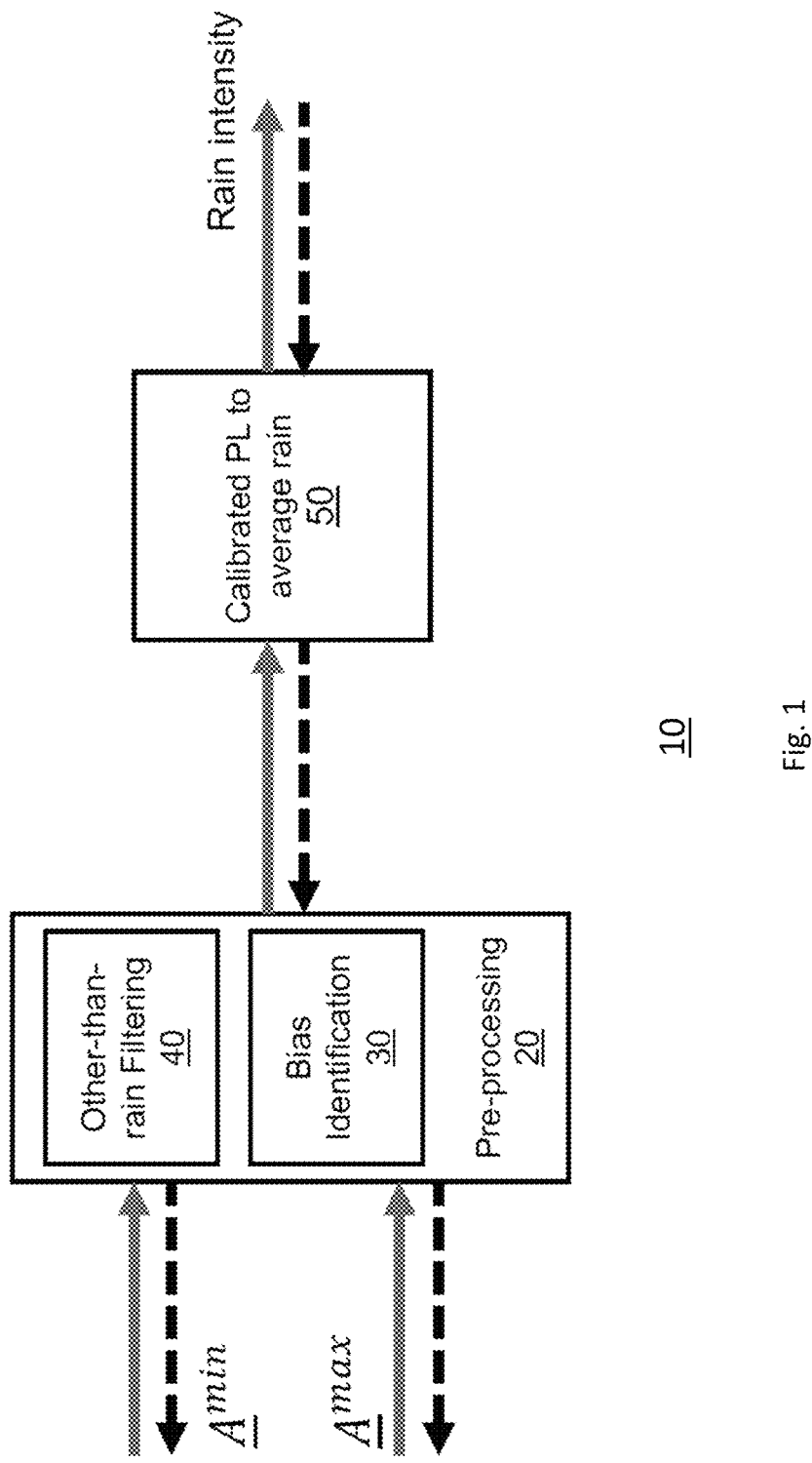
FIG. 1 is an example of a method for processing quantized information.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

It will be appreciated that for simplicity and clarity of illustration, elements shown in the figures have not necessarily been drawn to scale. For example, the dimensions. the elements may be exaggerated relative to other elements for clarity. Further, where considered appropriate, reference numerals may he repeated among the figures to indicate corresponding or analogous elements.

Any reference in the specification to a method should be applied mutatis mutandis to a a system capable of executing the method and to a computer program product that is non-transitory and stores instructions to execute the method.

Any reference in the specification to a system should be applied mutatis mutandis to a method that may be executed by the system and to a computer program product that is non-transitory and stores instructions to execute the method.

Any combination of any components of any of the systems illustrated in any of the figures may be provided.

In the claims and specification any reference to the term "consisting" should be applied mutatis mutandis to the term "comprising" and should be applied mutatis mutandis to the phrase "consisting essentially of".

There is provided a system, a computer program product and a method for establishing the relationship between the averaged rain intensity and the existing signal level measurements (quantized minimum and maximum measurements).

Any reference to rain may be applied mutatis mutandis to sleet or to any other forms of humidity or liquid in the air. Accordingly—there is provided a system, a computer program product and a method for establishing the relationship between the averaged sleet (or to any other forms of humidity or liquid in the air) intensity and the existing signal level measurements (quantized minimum and maximum measurements). For simplicity of explanation the following text refers to rain—but it should also be applied to sleet and to or to any other forms of humidity or liquid in the air.

The logs of quantized minimum and maximum measurements of a network management systems, can be used to determine average rain value and find quantization induced bias (hereinafter—bias).

The available signal level measurements pass a non-linear transformation. This transformation introduces a non-negligible bias into the measurements, which may influence the Link-Budget (LB) calculation. The ill-calculated LB may cause the network management tools to drop the bandwidth more than necessary, especially during rainy periods where the channel attenuation increases.

Accordingly—after the bias is found, the bias may be taken into account when managing the CMLs.

There is provided an optimal way to relate the available signal level measurements with the rain-induced attenuation.

The system, computer program product, and method may implement a standard monitoring of the network parameters (i.e., the CMLs LB and 'fading margin'), in an optimal way, by accurately calculating the link budget and minimizing the required fading margin.

The system, computer program product, and method may manage the network by routing the communication between different CMLs and determining transmission parameters (such as intensity and/or bandwidth and/or rate) over the links.

It has been found that the suggested method may accurately evaluate the status of a CML, (and accurately evaluate rain)—and may be used to accurately determine transmission parameters. Applying the suggested method on CML links that were previously set to lower than necessary transmission power (and thereby used to disconnect) indicated that the transmission power should be increased—thereby solving the disconnection problems. Yet for another example—the method may prevent over-allocation of transmission power. Applying the method showed that in various cases the values of Power Law coefficients (A and B) deviated from the expected values—and thus updated a and b are Power Law coefficients (A and B) were provided—for a more accurate estimate of the rain.

The system, computer program product, and method may use a standard NMS actual signal level measurements to estimate the rain in an optimal way—accurate rainfall monitoring.

The system, a computer program product and a method provide a more effective NMS, both for network monitoring (which result in overall increased channel bandwidth), as well as for rain monitoring purposes.

The system, computer program product, and method can be used in any location on earth, taking advantage of only the already existing equipment and standard signal monitoring systems, without the need for pre-calibration or side information.

The system, computer program product, and method dramatically reduce the computational resources and the memory resources required to provide an accurate estimation of rain and an accurate estimation of bias quantization—thereby provide an improvement in the computer science.

Commercial Microwave Links

The theory behind the relationship between the minimum and the maximum attenuation measurements (defined by the vectors $\underline{A}^{min}$ and $\underline{A}^{max}$, respectively) and the microwave-link path-averaged rain intensity is systematically established, without the need for pre-calibration or training. This relationship is bi-directional, and can be used to better design the microwave links fading margins, as well as to monitor the rain using the available extreme attenuation measurements in an optimal manner without any prior or side information.

FIG. 1 illustrates a method that include two pre-processing (20) stages (30 and 40) isolate (40) the rain-induced attenuation factor from the total attenuation, and identify and cancel (30) a quantization induced bias which affect the extreme attenuation measurements. A third stage (50) relates the extreme rain-induced attenuation with the averaged rain intensity The NMSs produce only a quantized version of the extreme Received Signal Level (RSL) (and if not constant the Transmitted Signal Level, TSL) samples, at 15-min intervals.

The fact that the available RSL and TSL measurements are quantized has in general been ignored.

However, the combination of a quantizer with a non-linear min/max operator induces a non-negligible bias to the output value. This bias, unless compensated, may cause an over-estimation of the rain. Fortunately, it can be shown that the expected value of this bias can be calculated using the available minimum and maximum RSL and TSL measurements themselves.

Combination of the Quantizer q(x) and the Min/Max Operators

The nearest-neighbor (or a "round") quantizer q(x) is defined by $$y = q(x) = L \cdot \text{round}\left(\frac{x}{L}\right)$$

where x is the input signal, y is the (quantized) output, and $0 < \in R$ is the quantization interval. Note that q(x) is considered to be both a uniform and a symmetric quantizer (Gray and Neuhoff, 1988).

It is noteworthy that the specific order of the operations regarding the min or max operators and the quantizer q(x) does not change the outcome, as described in Lemma 1.

Lemma 1. For any given $[x_i \in R]: i \in [1, 2, \ldots, n]$ $$\max(q(x_1), \ldots, q(x_n)) = q(\max(x_1, \ldots, x_n))$$

Lemma 1 similarly applies for the min operator.

Figure 2:
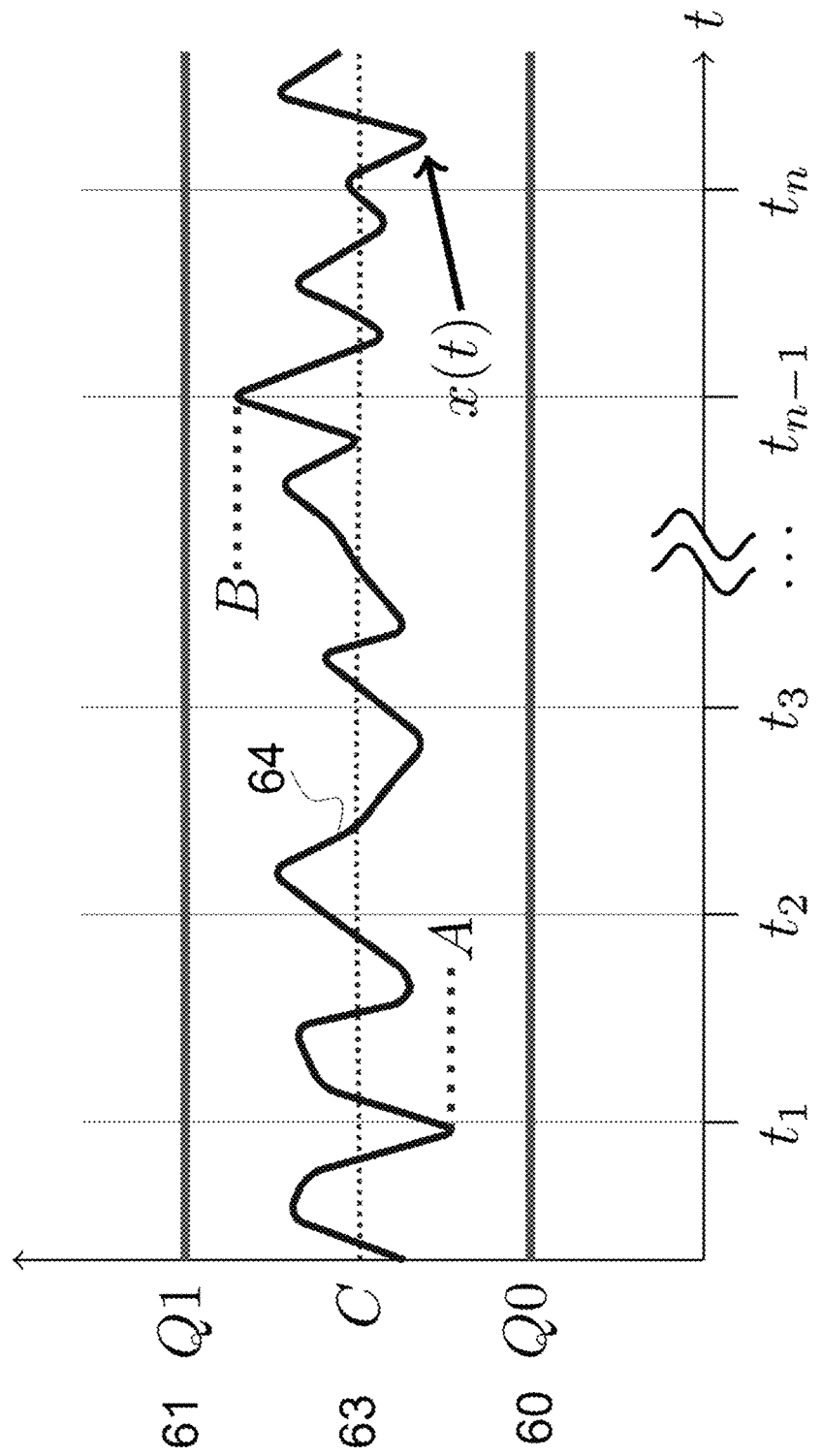
FIG. 2 is an example of a quantization process.

In order to demonstrate the combined effect of applying a min or max operator in combination with a quantizer q(x), a simple illustration is presented in FIG. 2.

C (63) is a known constant signal that lies between two consecutive quantization levels, marked by Q0 (60) and Q1 (61). w(t) is an unbiased additive noise, such that the sampled signal, x(t), equals x(t)=Q0+C=w(t). Specifically, the two consecutive quantization levels are plotted in the graph, marked by Q0 (60) and Q1 (62), and x(t) is plotted in curve 64 for C=Q0+0.5 ·$L_x$. A represents the minimal sample of x(t). A≡min(x($t_1$), x($t_2$), . . . , x($t_n$)), and B represents the maximal sample of x(t), B≡max(x($t_1$), x($t_2$), . . . , x($t_n$)).

In the illustration in FIG. 2, it is obvious that, given sufficient samples of x(t), i.e., $[x(t_i)]: i \in [1,2, \ldots, n]$ where $n \gg 1$, the following hold:

$$q(\min(x(t_1), x(t_2), \ldots, x(t_n))) = q(A) \xrightarrow[n \to \infty]{w.p.1} Q0$$

$$q(\max(x(t_1), x(t_2), \ldots, x(t_n))) = q(B) \xrightarrow[n \to \infty]{w.p.1} Q1$$

A formalization of the insights shown in FIG. 2 is detailed in the following Proposition:

Proposition 1. C is a constant signal, the value of which lies between two quantization levels, defined by Q0 and Q1, such that $Q0=k \cdot L$ and $Q1=Q0+L$, where $k \in N$. Given x(t), such that $x(t)=Q0=C+w(t)$ Where $0<C<L$, and w(t) is an unbiased additive shite noise, the samples of which are bounded such that $\forall i$ $Q0-0.5 \cdot L < x(t_i) < Q1+0.5 \cdot L$ $0 < \varepsilon " 0 : Pr[x(t_i) = Q0+(0.5-\varepsilon) \cdot L] > 0$ $0 < \varepsilon " 0 : Pr[x(t_i) = Q1-(0.5-\varepsilon) \cdot L] > 0$ The following hold:

$$\min(q(x(t_1)), \ldots, q(x(t_n))) \xrightarrow[n \to \infty]{w.p.1} Q0$$

$$\max(q(x(t_1)), \ldots, q(x(t_n))) \xrightarrow[n \to \infty]{w.p.1} Q1$$

Note that the proposition is presented for the case where the noise samples are bounded, so that the output of the quantizer is bounded between two consecutive quantization levels. However, the same conclusions can be expanded for the case where the noise samples follow the normal distribution ($\forall i : w(t_i) \sim N(0, o^2)$), by replacing the quantization interval, L, in Proposition 2 and its proof with a quantization gap (defined by g), where $g/L \in N$, such that g is sufficiently large that the noise is practically bounded ($g \gg o^2$). For simplicity, in the following, we assume that the noise is bounded such that $-1$ using defined noise profile $[w(t_i)]$. Furthermore, the equations are written using g.

Induced Bias

Based on the proof of Proposition 2, it can be shown that the quantized version of c(t_i), q(x(t_i)), is biased estimator of x(t_i), for an C:

$$E[q(x(t_i)) - x(t_i)] = E[q(x(t_i))] - Q0 - C$$

$$= Q0\left(\frac{1}{2} + \frac{g}{4l} - \frac{C}{2l}\right) + Q1\left(\frac{1}{2} - \frac{g}{4l} + \frac{C}{2l}\right) - Q0 - C$$

$$= \left(\frac{g}{2} - \frac{g^2}{4l} + \frac{gC(1-2l)}{2l}\right)$$

Although the estimator $q(x(t_i))$ is biased, without any prior information regarding the value of C, it can be shown that this estimation is unbiased on the average:

$$\frac{1}{g}\int_0^g \left(\frac{g}{2} - \frac{g^2}{4l} + \frac{gC(1-2l)}{2l}\right) dC = 0$$

This property of the quantizer justifies the fact that the quantization error was usually ignored.

However, implementation of a quantizer on the minimum or maximum values of $x(t_i)$ induces bias to the estimation process also on the average.

Based on Proposition 2 and its proof, the bias of min $(q(x(t_1)), \ldots, q(x(t_n)))$ and max $(q(x(t_1)), \ldots, q(x(t_n)))$ regarding $x(t_i)$ can be directly calculated:

$$E[\min(q(x(t_1)), \ldots, q(x(t_n))) - x(t_i)] =$$

$$E[\min(q(x(t_1)), \ldots, q(x(t_n))) - x(t_i)] - Q0 - C =$$

$$g\left(\frac{1}{2} + \frac{g}{4l} - \frac{C}{2l}\right)^2 - C \xrightarrow[n \to \infty]{} -C$$

$$E[\max(q(x(t_1)), \ldots, q(x(t_n))) - x(t_i)] =$$

$$E[\max(q(x(t_1)), \ldots, q(x(t_n))) - x(t_i)] - Q0 - C =$$

$$g\left(\frac{1}{2} + \frac{g}{4l} - \frac{C}{2l}\right)^2 - C \xrightarrow[n \to \infty]{} g - C$$

Unlike $q(x(t_i))$, both min $(q^*x(t_1)), \ldots, q(x(t_n)))$ and max $(q(x(t_1)), \ldots, q(x(t_n)))$ are biased also on the average:

$$\min(q(x(t_i))): \frac{1}{g}\int_0^g -CdC = -\frac{g}{2} \quad n \gg 1$$

$$\max(q(x(t_i))): \frac{1}{g}\int_0^g (g-C)dC = \frac{g}{2} \quad n \gg 1$$

Thus, two conclusions arise. First, a combination of a min/max operator and a quantizer introduces bias to the original measurements of $x(t_i)$, which may not be negligible, and second, this bias depends on the quantization gap, g.

Maximum and Minimum Transmitted Signal Level and Received Signal Level Measurements The NMSs monitor the TSL and the RSL of the CMLs. The specific sampling and logging protocols vary between hardware vendors. For instance, Ericsson™ systems usually sample the signal level at 10-sec intervals and save the minimum and the maximum values every 15 min, using a standard quantization interval of 1 dB for the TSL and 0.3 dB for the RSL website.

During dry periods, the CML-induced attenuation is considered to remain relatively constant (ITU-R.5.3.0, 2009), meaning that the transmitted power (defined by Tx) and the received power (defined by Rx) can be approximated as remaining constant. Thus, under the assumption that the minimum and the maximum TSL and RSL are extracted from sufficiently large series of instantaneous samples of Tx and Rx, which are assumed constant up-to addictive noise, $TSL_{min} = \min(Tx[1], Tx[2], \ldots, Tx[n]); n \gg 1$ $TSL_{max} = \max(Tx[1], Tx[2], \ldots, Tx[n]); n \gg 1$ $RSL_{min} = \min(Rx[1], Rx[2], \ldots, Rx[n]); n \gg 1$ $RSL_{max} = \min(Rx[1], Rx[2], \ldots, Rx[n]); n \gg 1$ The proposition is valid, and can be used to connect the CML path loss, which equals Tx"Rx, with the minimum channel attenuation taken from n samples, defined y $A_n^{min}$, and the maximum channel attenuation taken from the same n samples, defined by $A_n^{max}$, which yields $$A_n^{min} = TSL_{min} - RSL_{max} = \left(Tx - \frac{g_T}{2}\right) - \left(Rx + \frac{g_R}{2}\right) = (Tx - Rx) - \left(\frac{g_R}{2} + \frac{g_T}{2}\right)$$

$$A_n^{max} = TSL_{max} - RSL_{min} = \left(Tx - \frac{g_T}{2}\right) - \left(Rx + \frac{g_R}{2}\right) = (Tx - Rx) + \left(\frac{g_R}{2} + \frac{g_T}{2}\right)$$

Where gT is the quantization gap of the TSL values and gR is the quantization gap of the RSL values. From which, we get:

$$A_{diff} = A_n^{max} - A_n^{min} = g_T = g_R$$

Which connects the extreme attenuation measurements with the expected value of the bias. Although this calculation is made during dry periods, it can be assumed that the same expected value of the bias remains during rainy periods, as the rain does not affect the quantization intervals and levels. Thus, on average, the same bias occurs.

Other-than-rain Filtering

The total CML signal attenuation at time index t can be expressed by:

$$A_t(t) = A_r(t) = \Delta(t)$$

Where $A_t(t)$ (in dB) is the total induced attenuation at time index t, $A_r(t)$ (in dB) is the attenuation induced by rain at time index t of Eq. (3.1), and $\Delta(t)$, (in dB) represents the combined induced attenuation from any other-than-rain attenuation source at time index t.

To separate the baseline attenuation level $\Delta(t)$, and the attenuation due to rain $A_r(t)$, we rely on the physical properties of the different sources of attenuation and assume that there is a time-frame T in which the following assumptions can be approximate.

The rain rate is approximated to be a random process which samples satisfy conditions A1 and A2 of Proposition 1.

Other-than-rain attenuation-induced phenomena are assumed to be relatively constant within the time frame T, as these phenomena, as compared to rain, either change very slowly with time (fog, humidity, water vapor, and atmospheric gas concentrations) or are relatively constant outside a short transient time at the onset or the offset of the rain event (the WA effect).

Based on these assumptions, in combination with Proposition 1, given a sequence of a consecutive samples of the total attenuation, $[A_t(t_1), A_t(t_2), \ldots, A_t(t_n)]$, which are sampled at $t_i$ intervals, so that $T = n \cdot t_{i}$, $r^b L + \Delta(t_i)$ Which yields the approximation:
min $(A_t(t_1), A_t(t_2), \ldots, A_t(t_n)) = \Delta_n$
where $\Delta_n \approx \Delta(t_i): \forall i = [1, 2, \ldots, n]$ From which, the conclusion can be finalized $\forall i \in [1, 2, \ldots, n]$:

$$A_r(t_i) = A_t(t_i) - \Delta(t_i) \approx A_t(t_i) - \Delta_n =$$
$$= A_t(t_i) - \min(A_t(t_1), A_t(t_2), \cdots, A_t(t_n))$$

Accordingly—one can filter out any other-than-rain attenuation factors and extract the attenuation due to rain at time index $t_i$, $A_r(t_i)$, from a given sample of the total attenuation. $A_r(t_i)$, simply by subtracting the minimum value out of n consecutive samples of the total attenuation around the time index $t_k$.

Note that the choice of the time-frame T (and thus, the choice of n) are design coefficients, which may vary from case to case, with the only constraint being that the time index of interest satisfies $t_i \in T$.

In general, one seeks large n to obtain a better approximation of conditions A1 and A2, while restricting T to values where $\Delta$ can be assumed constant. Moreover, taking i such that $t_i$ lies at the end of the interval of T allows real-time processing, while allowing $t_i$ to be within the observation interval (say, in the middle) forces a delay of T/2

Calibrated Power-Law (PL) to averaged rain

The standard Power Law relationship relates the rain rate (in mm/b) at time t with the induced channel attenuation (in dB) at that time:

$$A_r(t) = ar(t)^b L$$

Where $A_r(t)$ (in dB) is the instantaneous induced attention due to rain, at time-index t, r(t) (in mm/h) is the CML path-averaged rain rate at that time, L (in km) is the CML path-length, and a, b are coefficients influenced by the specific CML frequency, polarization, and the rain Drop Size Distribution (DSD). These Power Law coefficients (a, b) are considered time-invariant, per location considering that the general climate classification of that location does not change over time. Thus, their values are updated only once every few years; they can be found in the technical publications of the ITU (ITU-R.838.38, 2005)

The goal of this section is to establish a new relationship that relates extreme attenuation measurements with the averaged values of the rain rate. It is shown that this relationship can be expressed as a revised Power Law-like form, which can be expressed in similar manner to the standard Power Law, by selecting a specific value of the coefficient a.

Averaged Rain Rate

Define the measurement vector $\underline{A}_r = [A_r(t_1), A_r(t_2, A_r(t_3); \ldots, A_r(t_k)]^T$, the K entries (in dB) of which represent the rain-induced attenuation at time indexes $t_1, t_2, \ldots$, sampled at a constant interval $\Delta t \equiv t_{j+1} - t_j$. Define the vector $\underline{R} = [r(t_1), r(t_2), r(t_3), \ldots, r(t_k)]^T$, the K entries of which (in mm/h) represent the values of the (CML path-averaged) rain rate at time indexes $t_1, t_2, \ldots, t_k$. Based on the Power Las, the empirical (path) averaged rain rate through-out the observation period $t_1 \leq t \leq k$, $\bar{r}$ (in mm/h), can be presented by $$\bar{r} = \frac{1}{K} \sum_{j=1}^{K} r(t_j) = \frac{\sum_{j=1}^{K} A_r(t_j)^{\frac{1}{b}}}{K(aL)^{\frac{1}{b}}}$$

Although straightforward, this formulation is unusable in our scenario, simply because the attenuation measurement vector $\underline{A}_r$ is unobservable. We are interested in the relationship between the averaged rain rate, $\bar{r}$, and the available attenuation measurements, which are the minimum entry and the maximum entry of $\underline{A}_r$, defined by $A^{min}$ and $A^{max}$, respectively.

Given M non-overlapping groups of K rain-induces attenuation and the corresponding rain-rate entries sampled at intervals of $\Delta t$, we developed a theoretical relationship between the averaged rain rate of the $i^{th}$ group ($i \in [1, 2, \ldots, M]$), defined by $r^i$, and the extreme attenuation values of that group, defined by $A^{i\ min}$ and $A^{i\ max}$, under the assumption that the entries of the vector $\underline{R}^i$, which represents the vector $\underline{R}$ of K entries of the $i^{th}$ group, are exponentially distributed with the parameter $\theta$ and are independent.

Under the assumption that each $\underline{R}^i$, $r^i(t_j)$, is exponentially distributed with parameter $\theta$, such that $$f_B(r^i, t_j; \theta) = \frac{1}{\theta} e^{\frac{r^i(t_j)}{\theta}},$$

the expected value of the entries $\underline{R}^i$ is known, and, under mild regularity conditions, we can write:

$$\bar{r}^i = \frac{1}{K} \sum_{j=1}^{K} r^i(t_i) \equiv \hat{E}[r^i(t)] \xrightarrow[K \to \infty]{} E[r^i(t)] = \theta$$

The expected value of the minimum and the maximum entries of $\underline{R}^i$ can be expressed as:

$$E[r^{i\_min}] = \frac{\theta}{K}$$

$$E[r^{i\_max}] \approx \theta(\ln(K) + \gamma)$$

Where $\gamma$ is Euler's constant, which equals $\gamma=0.57722$. As shown in (Gumbel, 1958), this approximation is accurate. For instance, for K=10, the difference between the actual and the approximation values of $E[r^{i\_max}]$ is less than 1.7%. for K=90, the difference drops to 0.11%.

By comparing $\theta$ and assuming that K is large enough (which is acceptable for rain monitoring using NMS, where, for instance K=90 for Ericsson systems), the averaged rain rate per interval, $r_{avg}$, can be expressed as:

$$r_{avg} \approx \left( \frac{A_r^{max}}{d_{cal}^{max} \cdot L} \right)^{\frac{1}{b}}$$

It should be noted that the NMS of Ericsson is merely an example of the NMS and data from NMS of other vendors may be used Where $\alpha^{max}{}_{cal} = \alpha(\ln(K)+\gamma)^b$ is effectively the calibrated coefficient $\alpha$ of the standard Power-Law.

The average rain per a period may be measured for each period out of multiple periods of time. The aggregate duration of the multiple periods of time may be minutes, days weeks, months, years and the like. Any period of time may be fifteen minutes long of may differ from fifteen minutes, long period—or during periods of time that differ from fifteen minutes.

Figure 3:
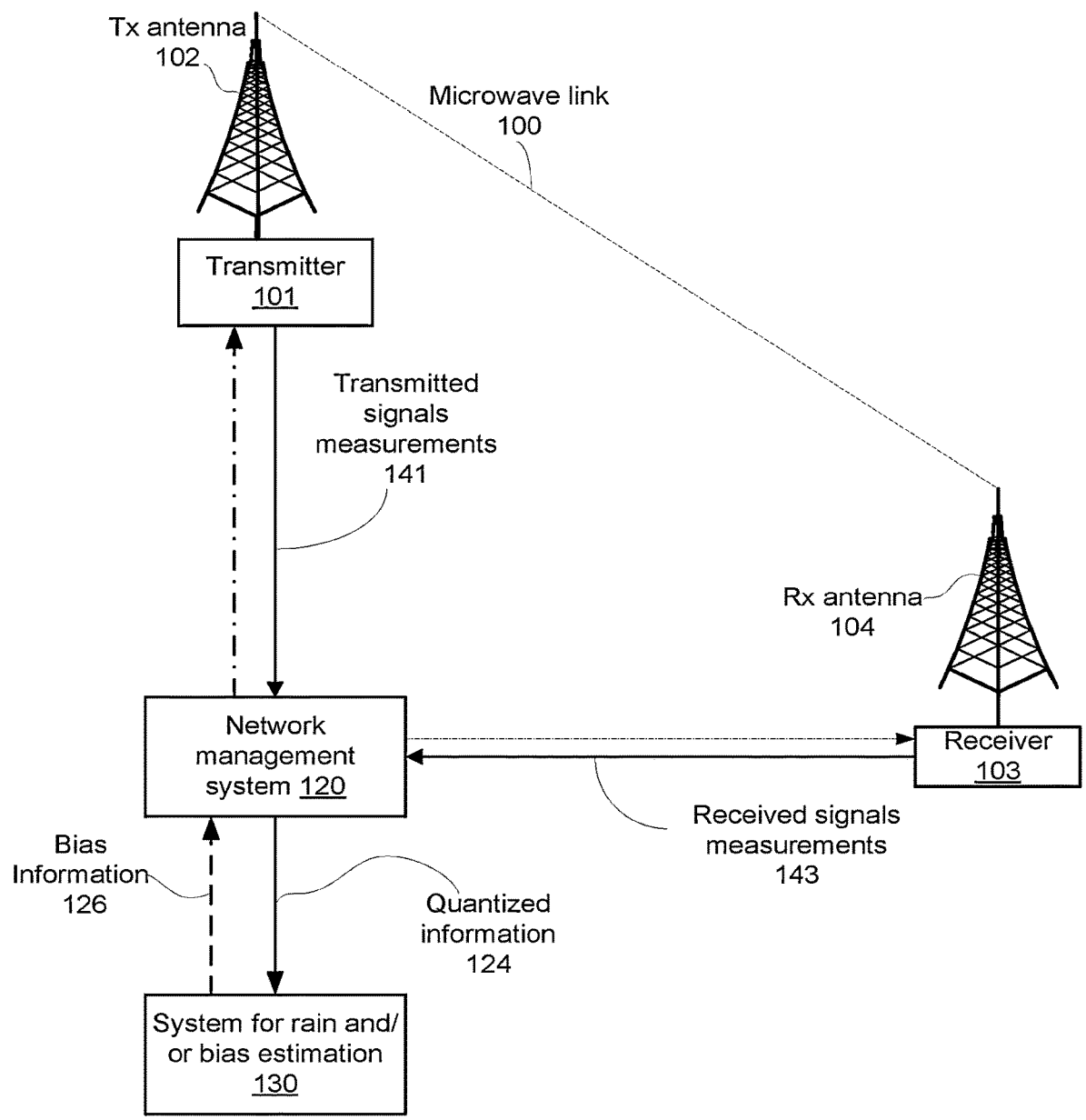
FIG. 3 illustrates a microwave link, a receive system, a transmit system, a network management system, and a computerized system for rain and/or bias estimation.

FIG. 3 illustrates a microwave link 100 between a receive system and a transmit system. The receive system includes receiver 103 and receive antenna (Rx antenna) 104. The transmit system includes transmitter 101 and transmit antenna (Tx antenna) 102.

Network management system 120 receives transmitted signals measurements 141 from transmitter 101 and receives received signals measurements 143 from receiver 143. These measurements may be provided in any rate—for example- each ten seconds.

Network management system 120 may generate quantized information 124 such as a quantized minimum level of received signals over a microwave link during a period, (b) a quantized maximum level of received signals over the microwave link during the period, (c) a quantized minimum level of transmitted signals over the microwave link during the period, and (d) a quantized maximum level of transmitted signals over the microwave link during the period.

The quantized information 124 may be sent to a computerized system for min and/or bias estimation 130.

The computerized system for rain and/or bias estimation 130 may be a server or other computerized system, may include one or more hardware processors, memory units and communication modules.

The computerized system for rain and/or bias estimation may be integrated in the network management system 120, may include sensors for measuring received and/or transmitted signals over the wireless link.

The network management system 120 may control the transmit system and the receive system. For example—control the power of the transmitted signals based on the reception parameters. The control may be responsive to bias value 126.

The system for rain and/or bias estimation 130 may calculate rain attributes and/or calculate bias.

Figure 4:
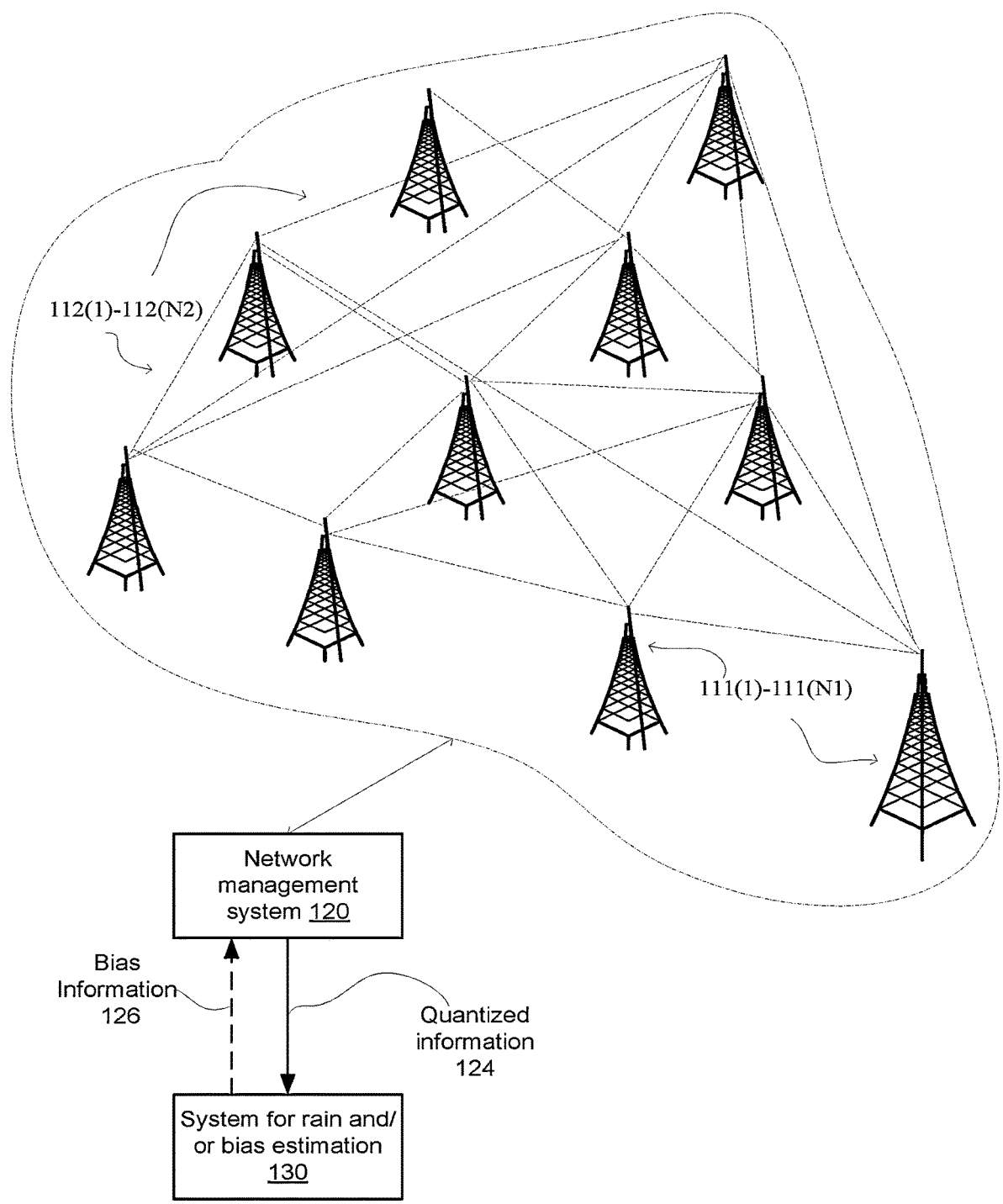
FIG. 4 illustrates microwave links, multiple receive and/or transmit systems, a network management system, and a computerized system for rain and/or bias estimation.

Usually the network management system 120 may control and/or receive information from multiple receive systems and/or transmit systems. This is illustrated in FIG. 4. For simplicity of explanation a receive and/or transmit system is represented by an antenna 111(1)-111(N1) that are linked to each by CMLs 112(1)-112(N2), wherein N2 usually exceeds N1.

A receive system and a transmit system may be combined to form transceiver signals. A bi-directions wireless link may be dealt as two unidirectional links.

The wireless links may be commercial wireless links—for example base stations of cellular networks.

FIG. 5 illustrates an example of method 300

Method 300 may include the following steps:
a. Obtaining (a) a quantized minimum level of received signals over a microwave link during a period, (b) a quantized maximum level of received signals over the microwave link during the period, (c) a quantized minimum level of transmitted signals over the microwave link during the period, and (d) a quantized maximum level of transmitted signals over the microwave link during the period. (Step 310).
b. Subtracting (i) the quantized minimal level of received signals over the microwave link during the period from (ii) the quantized minimum level of transmitted signals over the microwave link during the period to provide a minimal attenuation value. (Step 310).
c. Subtracting (i) the quantized minimal level of received signals over the microwave link during the period from (ii) the quantized maximal level of transmitted signals over the microwave link during the period to provide a maximal attenuation value. (Step 330).
d. Calculating an attenuation difference related to the period by subtracting the minimal attenuation value from the maximal attenuation value. (Step 340).
e. Calculating a bias compensated attenuation difference based on the attenuation difference, and bias value related to the microwave link. (Step 350).
f. Calculating the rain attribute based on the bias compensated attenuation difference. (Step 360).

The rain attribute may be an attribute related to the rain- for example an average rain during the period.

Step 360 may include calculating the average rain during the period by calculating:

$$\left( \frac{A_r^{max}}{d_{cal}^{max} \cdot L} \right)^{\frac{1}{b}}$$

wherein $A^{max}_r$ is the bias compensated attenuation difference. L is a length of the microwave link $\alpha^{max}_{cal}$ equals $\alpha(\ln(K)+\gamma)^b$, a and b are Power Law coefficients.

Method 300 may include step 345 of calculating the bias value related to the microwave link. The method may include receiving the bias value.

Step 345 may include calculating the bias value related to the microwave link by subtracting (i) a minimal attenuation value related to a test period from (ii) a maximal attenuation value related to the test period; wherein the test period is free of rain and during which a signal of constant power is transmitted over the microwave link.

The period may exceed five minutes—may be fifteen minutes, less than five minutes or more than five minutes.

Method 300 may include step 370 of performing microwave link management operations based on the bias value.

Step 370 may include controlling a power of signals transmitted over the microwave link based on the bias value.

Step 310 may include receiving the quantized information, or generating the quantized information. Step 310 may include, for example, measuring a minimum level of received signals over a microwave link during the period, the maximum level of received signals over the microwave link during the period, a minimum level of transmitted signals over the microwave link during the period. This is followed by performing a quantization process.

It should be noted that the quantized minimal information may be gathered over a period that is longer than the period of time related to the maximum information. This increases the chance of receiving a minimum value of a subperiod (usually few seconds long) that is without rain or with a minimal amount of rain. Method 300 may be amended accordingly.

FIG. 6 illustrates an example of method 400.

Method 300 may include a. Obtaining (a) a quantized minimum level of received signals over a microwave link during a test period that is rainless and during which a signal of constant power is transmitted over the microwave link, (b) a quantized maximum level of received signals over the microwave link during the test period, (c) a quantized minimum level of transmitted signals over the microwave link during the test period, and (d) a quantized maximum level of transmitted signals over the microwave link during the test period. (Step 410).

b. Subtracting (i) the quantized maximum level of received signals over the microwave link during the test period from (ii) the quantized minimum level of transmitted signals over the microwave link during the test period to provide a minimal attenuation value. (Step 420).

c. Subtracting (i) the quantized minimal level of received signals over the microwave link during the test period from (ii) the quantized maximal level of transmitted signals over the microwave link during the test period to provide a maximal attenuation value. (Step 430).

d. Calculating a bias value by subtracting the minimal attenuation value from the maximal attenuation value. (Step 440).

Method 400 may include step 470 of performing microwave link management operations based on the bias value.

Step 470 may include controlling a power of signals transmitted over the microwave link based on the bias value. For example- reducing a power transmit increment by the bias value.

Stem 410 may include measuring a minimum level of received signals over a microwave link during the test period, a maximum level of received signals over the microwave link during the test period, a minimum level of transmitted signals over the microwave link during the test period, and a maximum level of transmitted signals over the microwave link during the test period.

According to an embodiment the level of transmitted signals is constant and the constant level may be known or provided. Any of the mentioned above methods, systems and computer program product may use information about the constant level of the transmitted signals instead of using the quantized minimum level and quantized maximum level of the transmitted signals.

There may be provided a computerized method for estimation a rain attribute, the method may include obtaining (a) a quantized minimum level of received signals over a microwave link during a first period, (b) a quantized maximum level of received signals over the microwave link during a period that is included in the first period, (c) information about a constant level of transmitted signals over the microwave link during the period; subtracting (i) the quantized maximum level of received signals over the microwave link during the period from (ii) the constant level of transmitted signals over the microwave link during the first period to provide a minimal attenuation value, subtracting (i) the quantized minimal level of received signals over the microwave link during the first period from (ii) the constant level of transmitted signals over the microwave link during the period to provide a maximal attenuation value; calculating an attenuation difference by subtracting (i) the minimal attenuation value from (ii) the maximal attenuation value; calculating a bias compensated attenuation difference based on (i) the attenuation difference and (ii) bias value related to the microwave link; and calculating the rain attribute based on the bias compensated attenuation difference.

There may be provided a computerized method for bias detection, the method may include obtaining (a) a quantized minimum level of received signals over a microwave link during a test period that is rainless and during which a signal of constant power is transmitted over the microwave link, (b) a quantized maximum level of received signals over the microwave link during the test period, (c) information about a constant level of transmitted signals over the microwave link during the test period; subtracting (i) the quantized maximum level of received signals over the microwave link during the test period from (ii) the constant level of transmitted signals over the microwave link during the test period period to provide a minimal attenuation value subtracting (i) the quantized minimal level of received signals over the microwave link during the test period from (ii) the constant level of transmitted signals over the microwave link during the test period to provide a maximal attenuation value; and calculating bias value by subtracting the minimal attenuation value from the maximal attenuation value.

There may be provided a computerized method for estimating a rain attribute, the method may include obtaining (a) a quantized minimum level of received signals over a microwave link during a period, (b) information about the quantized maximum level of received signals over the microwave link during the period, (c) information about a constant level of transmitted signals over the microwave link during the period; subtracting (i) the quantized maximum level of received signals over the microwave link during the period from (ii) the constant level of transmitted signals over the microwave link during the period to provide a minimal attenuation value; subtracting (i) the quantized minimal level of received signals over the microwave link during the period from (ii) the constant level of the transmitted signals over the microwave link during the period to provide a maximal attenuation value; calculating an attenuation difference related to the period by subtracting the minimal attenuation value from the maximal attenuation value; calculating a bias compensated attenuation difference based on the attenuation difference, and bias value related to the microwave link; and calculating the rain attribute based on the bias compensated attenuation difference.

Appendix A to the specification provides examples of one of the suggested above methods.

Any reference to any of the terms "comprise", "comprises ", "comprising", "including", "may include", "includes" may be applied to any of the terms "consists", "consisting", and "consisting essentially of". For example —any of the rectifying circuits illustrated in any figure may include more components that those illustrated in the figure, only the components illustrated in the figure or substantially only the components illustrated in the figure.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front", "back", "top", "bottom", "over", "under","" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is "associated with " each other such that the desired functionality is achieved, irrespective of architectures of intermedial components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternations and alternatives are also possible. The specifications and drawings are, accordingly, to be regarded in an illustrative rather than in a restrictive sense.

In the claims, any reference signs placed between parentheses shall not be construed as limiting the claim. The word 'comprising', does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

While certain features of the invention have been illustrated and described herein, many modifications, substitutions, changes, and equivalents will now occur to those of ordinary skill in the art. It is, therefore, to be understood that the appended claims are intended to cover all such notifications and changes as fall within the true spirit of the invention.

We claim:

1. A computerized method for determining a rain attribute level based on microwave link management data, the method comprising:

determining an attenuation difference related to a period by:
obtaining (a) a quantized minimum level of received signals over a microwave link during a period, (b) a quantized maximum level of received signals over the microwave link during the period, (c) a quantized minimum level of transmitted signals over the microwave link during the period, and (d) a quantized maximum level of transmitted signals over the microwave link during the period;
providing a minimal attenuation value by subtracting (i) the quantized maximum level of received signals over the microwave link during the period from (ii) the quantized minimum level of transmitted signals over the microwave link during the period;
providing a maximal attenuation value by subtracting (i) the quantized minimal level of received signals over the microwave link during the period from (ii) the quantized maximal level of transmitted signals over the microwave link during the period; and
calculating an attenuation difference related to the period by subtracting the minimal attenuation value from the maximal attenuation value;

calculating a bias compensated attenuation difference based on the attenuation difference, and signal quantization bias value related to the microwave link;

determining the rain attribute level based on the bias compensated attenuation difference, said determining the rain attribute level comprises determining an average rain during the period in accordance with a relation $$\left(\frac{A_r^{max}}{d_{cal}^{max} \cdot L}\right)^{\frac{1}{b}}$$

wherein $A^{max}_r$ is the bias compensated attenuation difference, L is a length of the microwave link, $\alpha^{max}_{cal}$ is approximated by a (ln (K)+γ)b, a and b are Power Law coefficients, γ is Euler's constant, and K is number of entries during the period.

2. The computerized method according to claim 1, comprising calculating signal quantization the bias value related to the microwave link.

3. The computerized method according to claim 1, comprising calculating the signal quantization bias value related to the microwave link by subtracting (i) a minimal attenuation value related to a test period from (ii) a maximal attenuation value related to the test period; wherein the test period is free of rain and during which a signal of constant power is transmitted over the microwave link.

4. The computerized method according to claim 1, wherein the period exceeds 5 minutes.

5. The computerized method according to claim 1, comprising performing microwave link management operations based on the signal quantization bias value.

6. The computerized method according to claim 1, comprising controlling a power of signals transmitted over the microwave link based on the signal quantization bias value.

7. The computerized method according to claim 1, comprising measuring a minimum level of received signals over a microwave link during the period, the maximum level of received signals over the microwave link during the period, a minimum level of transmitted signals over the microwave link during the period, and a maximum level of transmitted signals over the microwave link during the period.

8. A computer program product stored on a non-transitory computer readable medium and comprising instructions that once executed by a computerized system cause the computerized system to determine a rain attribute level based on microwave link management data, by:

determining an attenuation difference related to a period by:

obtaining (a) a quantized minimum level of received signals over a microwave link during a period, (b) a quantized maximum level of received signals over the microwave link during the period, (c) a quantized minimum level of transmitted signals over the microwave link during the period, and (d) a quantized maximum level of transmitted signals over the microwave link during the period;

providing a minimal attenuation value by subtracting (i) the quantized maximum level of received signals over the microwave link during the period from (ii) the quantized minimum level of transmitted signals over the microwave link during the period;

providing a maximal attenuation value by subtracting (i) the quantized minimal level of received signals over the microwave link during the period from (ii) the quantized maximal level of transmitted signals over the microwave link during the period; and determining the attenuation difference related to the period by subtracting the minimal attenuation value from the maximal attenuation value;

determining a bias compensated attenuation difference based on the attenuation difference, and a signal quantization bias value related to the microwave link;

determining the rain attribute level based on the bias compensated attenuation difference, said determining the rain attribute level comprises determining an average rain during the period in accordance with a relation $$\left( \frac{A^{max}_r}{\alpha^{max}_{cal} \cdot L} \right)^{\frac{1}{b}}$$

wherein $A^{max}_r$ is the bias compensated attenuation difference, L is a length of the microwave link, $\alpha^{max}_{cal}$ is approximated by a (ln (K)+γ)b, a and b are Power Law coefficients, γ is Euler's constant, and K is number of entries during the period.

9. The computer program product according to claim 8, that stores instructions for calculating the signal quantization bias value related to the microwave link.

10. The computer program product according to claim 8, comprising instructions for determining the signal quantization bias value related to the microwave link by subtracting (i) a minimal attenuation value related to a test period from (ii) a maximal attenuation value related to the test period; wherein the test period is free of rain and during which a signal of constant power is transmitted over the microwave link.

11. The computer program product according to claim 10, wherein the period exceeds 5 minutes.

12. The computer program product according to claim 8, that stores instructions for performing microwave link management operations based on the signal quantization bias value.

13. The computer program product according to claim 8, that stores instructions for controlling a power of signals transmitted over the microwave link based on the signal quantization bias value.

14. The computer program product according to claim 8, that stores instructions for measuring a minimum level of received signals over a microwave link during the period, the maximum level of received signals over the microwave link during the period, a minimum level of transmitted signals over the microwave link during the period, and a maximum level of transmitted signals over the microwave link during the period.

15. A system comprising a processor, a communication module and a memory unit, wherein the processor is constructed and arranged to determine a rain attribute level based on microwave link management data by:

determining an attenuation difference related to a period by:

obtaining (a) a quantized minimum level of received signals over a microwave link during a period, (b) a quantized maximum level of received signals over the microwave link during the period, (c) a quantized minimum level of transmitted signals over the microwave link during the period, and (d) a quantized maximum level of transmitted signals over the microwave link during the period;

providing a minimal attenuation value by subtracting (i) the quantized maximum level of received signals over the microwave link during the period from (ii) the quantized minimum level of transmitted signals over the microwave link during the period;

providing a maximal attenuation value by subtracting (i) the quantized minimal level of received signals over the microwave link during the period from (ii) the quantized maximal level of transmitted signals over the microwave link during the period; and calculating the attenuation difference related to the period by subtracting the minimal attenuation value from the maximal attenuation value;

calculating a bias compensated attenuation difference based on the attenuation difference, and a signal quantization bias value related to the microwave link; and determining the rain attribute level based on the bias compensated attenuation difference, said determining the rain attribute level comprises determining an average rain during the period in accordance with a relation $$\left(\frac{A_r^{max}}{\alpha_{cal}^{max} \cdot L}\right)^{\frac{1}{b}}$$

wherein $A^{max}_r$ is the bias compensated attenuation difference, L is a length of the microwave link, $\alpha^{max}_{cal}$ is approximated by a $(\ln(K)+\gamma)b$, a and b are Power Law coefficients, $\gamma$ is Euler's constant, and K is number of entries during the period.

* * * * *